US006814495B2

(12) United States Patent
Toda et al.

(10) Patent No.: US 6,814,495 B2
(45) Date of Patent: Nov. 9, 2004

(54) BEARING DEVICE AND METHOD OF MANUFACTURING THE BEARING DEVICE

(75) Inventors: Kazutoshi Toda, Osaka (JP); Shinichirou Kashiwagi, Osaka (JP); Tomohiro Ishii, Osaka (JP); Tadashi Mitarai, Osaka (JP); Daisaku Tomita, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 112 days.

(21) Appl. No.: 10/362,338
(22) PCT Filed: Aug. 13, 2001
(86) PCT No.: PCT/JP01/06965
§ 371 (c)(1),
(2), (4) Date: Feb. 20, 2003
(87) PCT Pub. No.: WO02/16790
PCT Pub. Date: Feb. 28, 2002

(65) Prior Publication Data
US 2003/0185479 A1 Oct. 2, 2003

(30) Foreign Application Priority Data
Aug. 21, 2000 (JP) ........................................ 2000-249299

(51) Int. Cl.$^7$ ............................ F16C 43/04; B23P 15/00
(52) U.S. Cl. ..................................... 384/544; 29/898.07
(58) Field of Search ................................ 384/544, 589; 29/848.06–898.07

(56) References Cited

U.S. PATENT DOCUMENTS

| | | | | |
|---|---|---|---|---|
| 5,226,738 A | * | 7/1993 | Valette et al. | 384/513 |
| 5,490,732 A | | 2/1996 | Hofmann et al. | |
| 5,822,859 A | * | 10/1998 | Kessen et al. | 29/898.061 |
| 6,113,279 A | | 9/2000 | Sawai et al. | |
| 6,280,096 B1 | * | 8/2001 | Miyazaki et al. | 384/544 |
| 6,398,419 B1 | * | 6/2002 | Kashiwagi et al. | 384/537 |
| 6,422,758 B1 | * | 7/2002 | Miyazaki et al. | 384/544 |

FOREIGN PATENT DOCUMENTS

JP  2000-211302  8/2000

* cited by examiner

Primary Examiner—Thomas R. Hannon
(74) Attorney, Agent, or Firm—Jordan and Hamburg LLP

(57) ABSTRACT

A bearing device comprising a shaft body having an axially cylindrical portion in a free end side thereof and a rolling bearing fitted around an outer peripheral surface of the shaft body, wherein the cylindrical portion is bent and deformed radially outward by a rolling caulking to be caulked thereby on an outer end face of an inner ring of the rolling bearing. An inner peripheral surface of the cylindrical portion is formed by a turning work, and a residual stress left in a surface layer of the inner peripheral surface of the cylindrical portion by the turning work is set to a value capable of restraining a crack generation ratio in the inner peripheral surface to less than a predetermined rate, desirably to not more than 5 kgf/mm$^2$.

42 Claims, 10 Drawing Sheets

Axial direction

F I G. 2
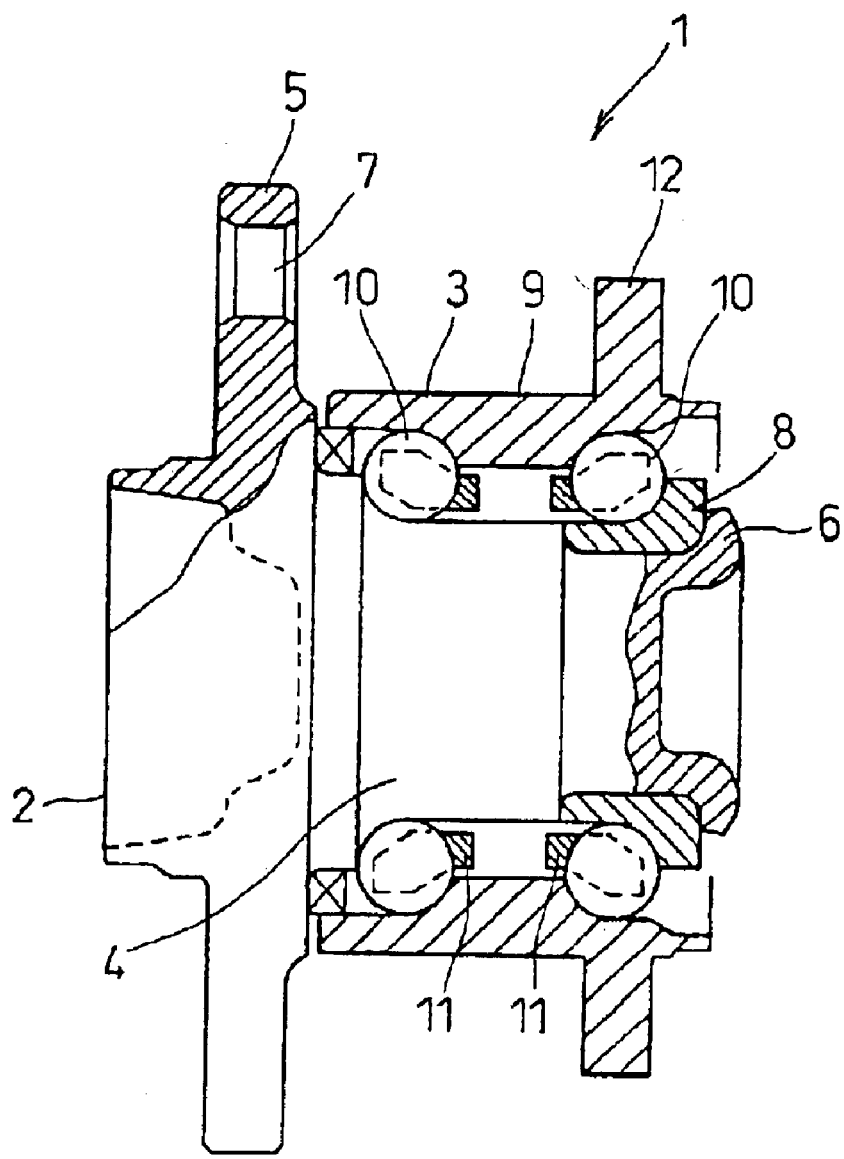
Axial direction
←——→

F I G. 8
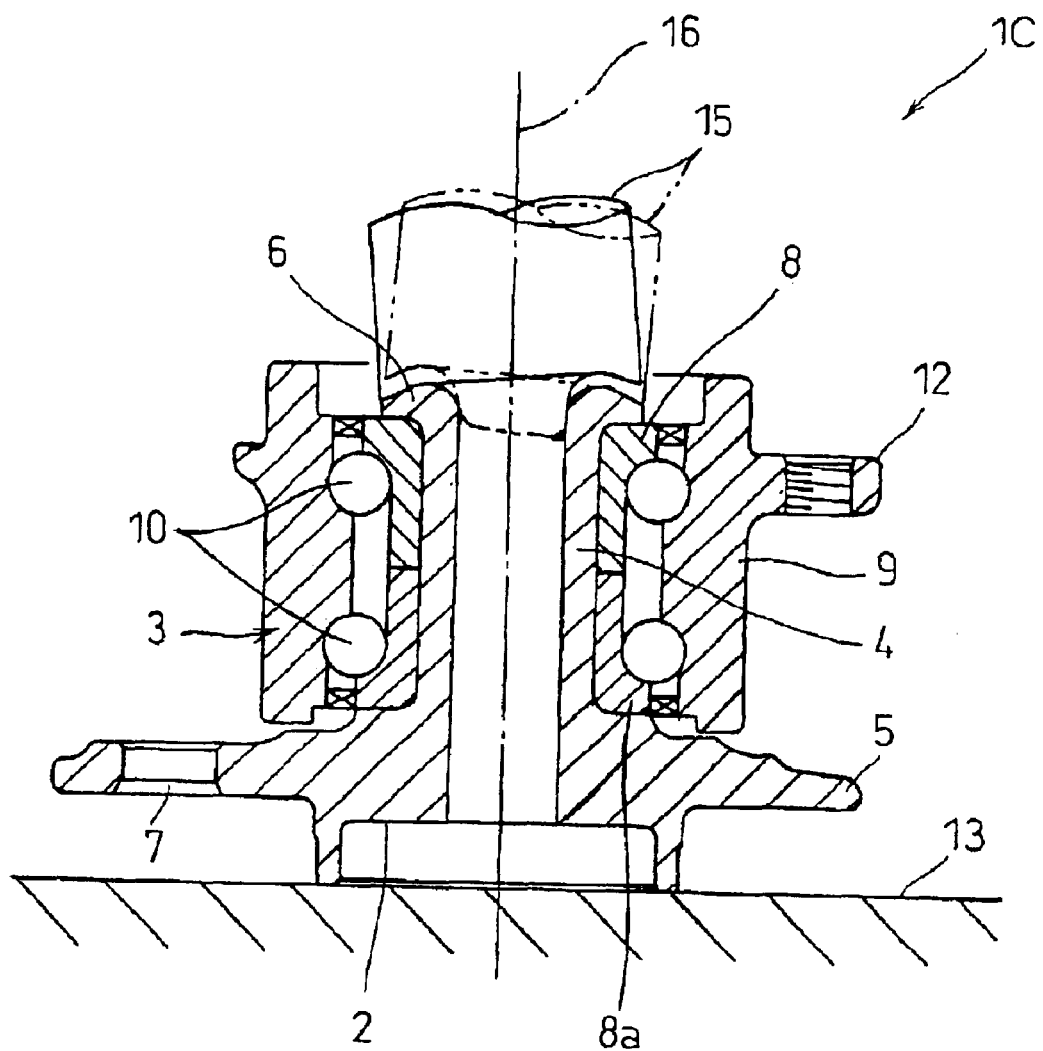

BEARING DEVICE AND METHOD OF MANUFACTURING THE BEARING DEVICE

TECHNICAL FIELD

This invention relates to a bearing device in which a rolling bearing is fitted around an outer periphery of a shaft body such as a hub unit for vehicles and a method of manufacturing the same.

BACKGROUND TECHNIQUE

A hub unit for vehicles generally has a structure wherein a double row rolling bearing is fitted around an outer periphery of a shaft body of a hub wheel so as not to come off.

The shaft body of the hub wheel is provided in a free end side thereof with a cylindrical portion used for the bearing not to come off. The cylindrical portion is bent and deformed radially outward by a caulking jig, and thereby being caulked on an outer end face of an inner ring of the bearing so as to constitute a caulked portion. The bearing is prevented from coming off the hub wheel by the caulked portion, and simultaneously, the inner ring of the bearing is preloaded from the caulked portion.

For the hub unit described above, cracks which may adversely influence the performance of the hub unit are occasionally generated on the surface of the caulked portion. Therefore, an inspection for a crack generation ratio is generally executed to all of hub units which have been manufactured.

In this case, since cracks per se are minute, the inspection using an inspection machine requires a microscopic and laborious work. Furthermore, in the case of a conventional hub unit, a crack generation ratio comes with a scattering result, thereby the crack generation ratio inspection is highly time-consuming, which may result in lowering the manufacturing efficiency of the hub unit.

Therefore, a main object of the present invention is to provide a bearing device capable of accurately controlling a crack generation ratio and a method of manufacturing such bearing device.

Another object of the present invention is to provide a bearing device capable of restraining a crack generation ratio to less than a predetermined value and a manufacturing method thereof.

Still another object, features and advantages of the present invention will be apparent from the described hereafter.

DISCLOSURE OF THE INVENTION

A bearing device of the present invention comprises a shaft body having a caulking cylindrical portion which is formed by a machine work in a free end side of the shaft body and a rolling bearing fitted around an outer periphery of the shaft body. The cylindrical portion is bent and deformed radially outward to be caulked on an outer end face of an inner ring of the rolling bearing. Also, a residual stress is left by the machine work on a surface layer of an inner peripheral surface of the inner ring. The residual stress is set to a value capable of restraining a crack generation ratio to less than a predetermined rate.

A shape of the cylindrical portion comprises all kinds of shapes such as a radial wall thickness thereof is uniform, becomes gradually thinner or varies stepwise intermediately toward the free end side of the shaft body.

The residual stress is not restricted to a strain stress, however comprises a compression stress as well.

The cracks, regardless of a size thereof, are not restricted to cracks generated on the surface of the caulked cylindrical portion, however comprises all forms of cracks such as cracks spreading inside.

A value less than the predetermined value may or may not include zero.

The machine work comprises a turning work using a turning tool, a drilling work using a drill and other works using other machine tools.

The formation of the cylindrical portion on the free end side of the shaft body using a machine tool accompanies heat generation. When the heat temperature becomes too high and the cylindrical portion is overheated thereby, a texture of a surface layer of an inner peripheral surface thereof is degenerated into slightly stiffening or the like. A stress is likely to be left in the degenerated surface layer of the inner peripheral surface of the cylindrical portion. Depending on the amount of the residual stress, cracks are easily generated during the process of radially-outward bending of the cylindrical portion.

In the case of the bearing device according to the present invention, the residual stress is set according to such a manner of the crack generation. This enables restraining the crack generation ratio to less than the predetermined rate.

Therefore, according to the bearing device of the present invention, it is possible to provide the bearing device wherein the crack generation ratio is less than the predetermined rate on the basis of control of the residual stress in the cylindrical portion and by restraining the crack generation ratio. As a result, an inspection for the crack generation ratio becomes unnecessary, leading thereby to an improved manufacturing efficiency.

As a preferable embodiment of the present invention, the cylindrical portion is formed by a turning work.

As a preferable embodiment of the present invention, the cylindrical portion is bent and deformed radially outward by a rolling caulking.

As a preferable embodiment of the present invention, the residual stress is set to a value of 5 kgf/mm$^2$ or less.

As a preferable embodiment of the present invention, the residual stress is set to a value of 10 kgf/mm$^2$ or less.

BRIEF DESCRIPTION OF THE DRAWINGS

FIG. 2. is a longitudinal sectional view of a hub unit which has been caulked according to the best mode for executing the present invention.

FIG. 8 is a longitudinal sectional view of a hub unit according to still another mode for executing the present invention.

THE BEST MODE FOR CARRYING OUT THE INVENTION

Figure 1:
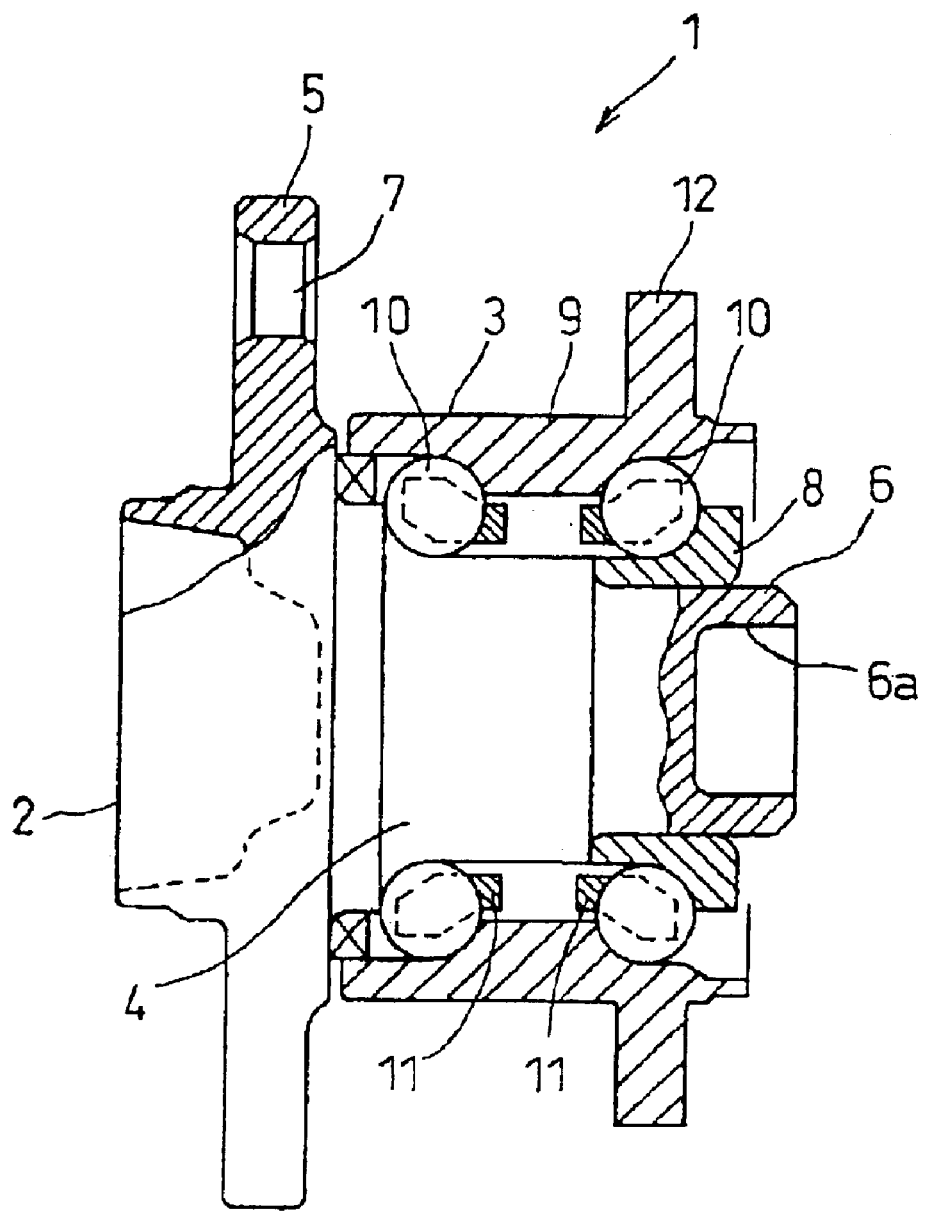
FIG. 1 is a longitudinal sectional view of a hub unit prior to a caulking work according to the best mode for executing the present invention.
Figure 3:
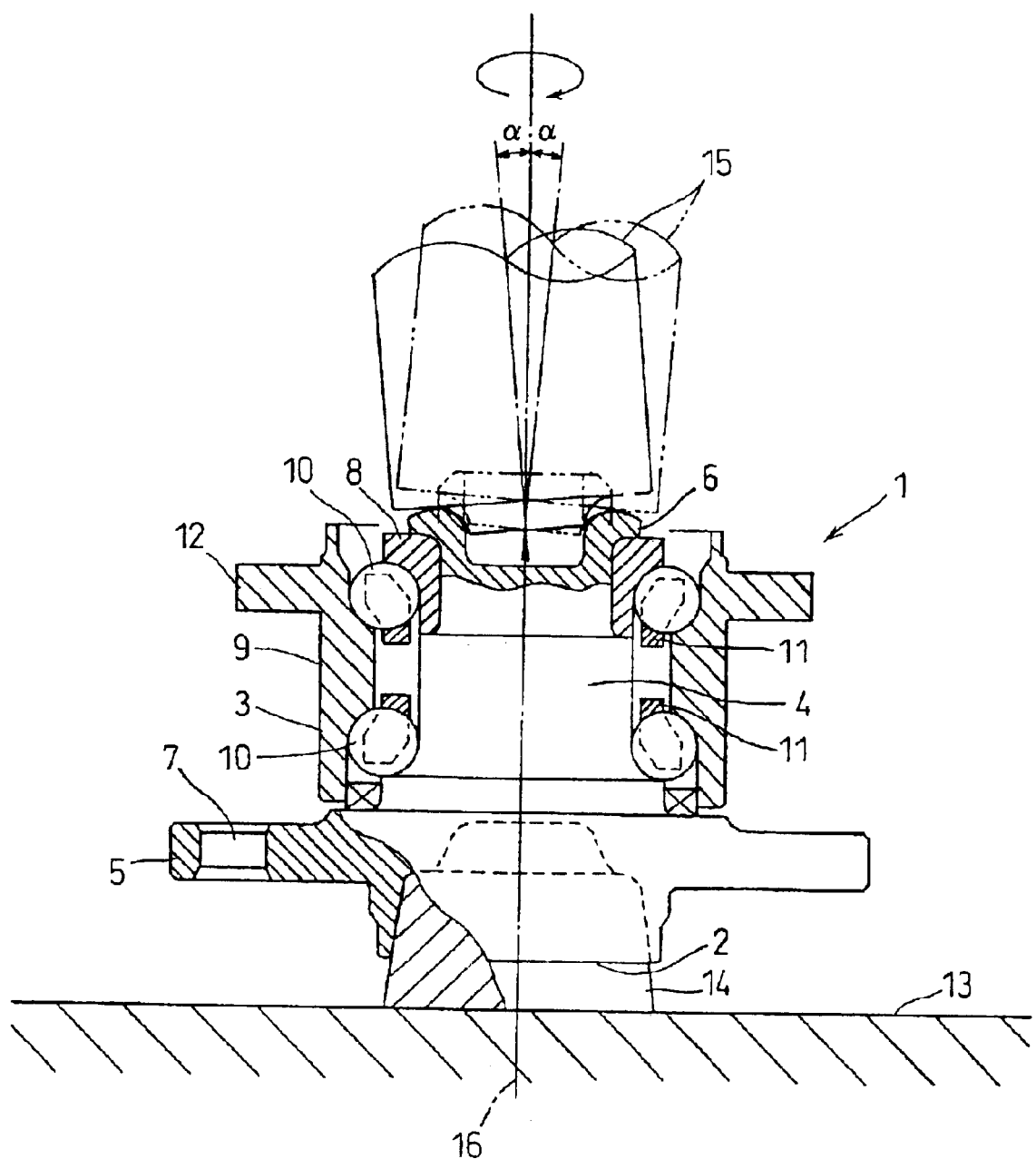
FIG. 3. is a longitudinal sectional view of a hub unit provided for explanation of a caulking work.
Figure 4:
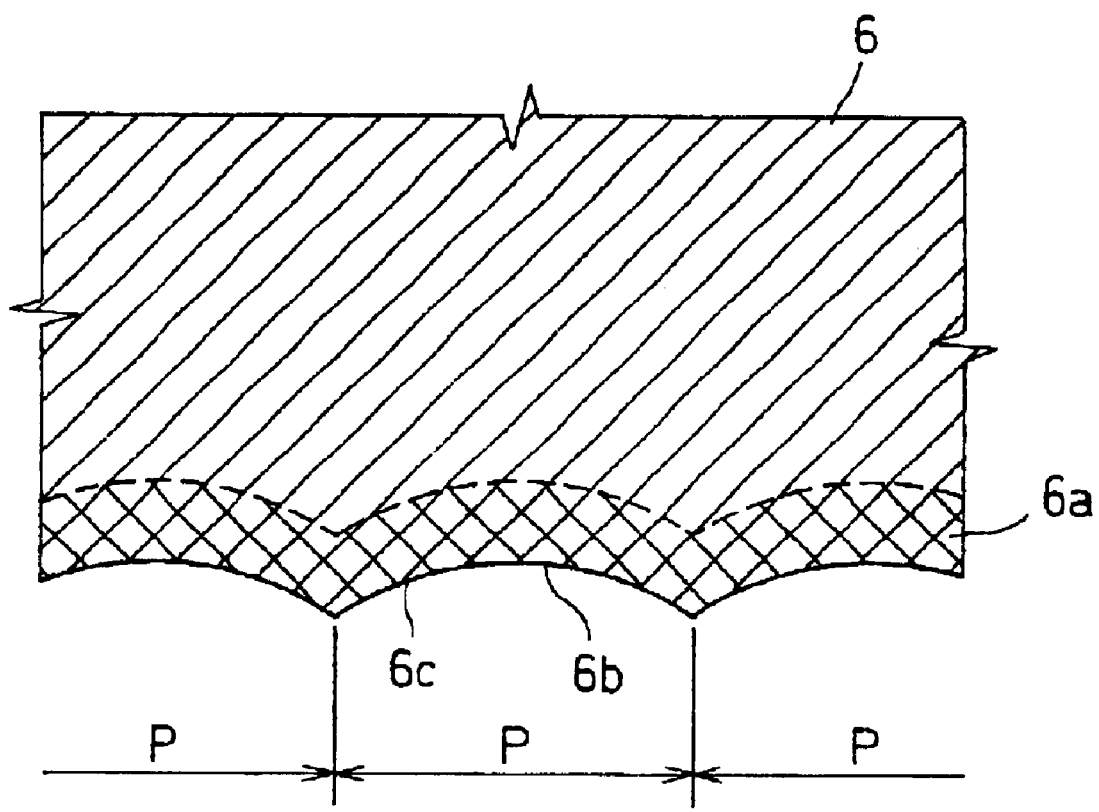
FIG. 4 is a partly enlarged view of a surface layer of an inner peripheral surface of a cylindrical portion shown in FIG. 1.
Figure 5:
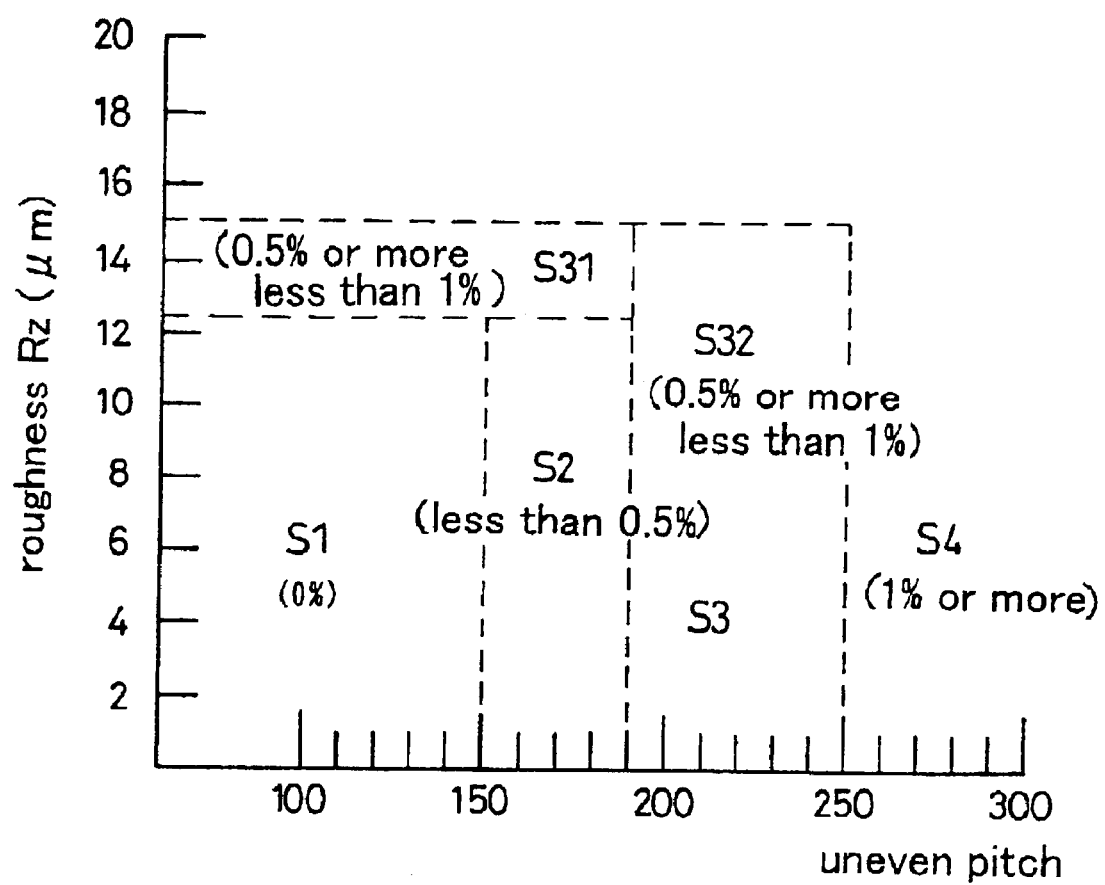
FIG. 5 is a chart showing a crack generation ratio with respect to a hub unit when a caulking cylindrical portion is caulked.

FIGS. 1 through 5 relate to a hub unit according to the best mode of the present invention. FIG. 1 is a longitudinal sectional view of a hub unit prior to a caulking work. FIG. 2 is a longitudinal sectional view of a hub unit which has been caulked. FIG. 3. is a longitudinal sectional view of a hub unit provided for explanation of a caulking work. FIG. 4 is a partly enlarged view of a surface layer of an inner periphery of a cylindrical portion. FIG. 5 is a chart showing a crack generation ratio with respect to a hub unit when a caulking cylindrical portion is caulked.

Referring to these figures, a vehicle-use hub unit 1 comprises a hub wheel 2, and a double row angular ball bearing 3 with vertex of contact angles outside of bearing as an example of a rolling bearing.

The hub wheel 2 has a shaft body 4 and a flange 5.

The shaft body 4, in a free end side thereof, has a cylindrical portion 6 having an inner peripheral surface which axially extends and has a radial wall thickness substantially uniform in the axial direction.

The flange 5 of the hub wheel is provided radially outward on an outer periphery of the shaft body 4 and has some bolt holes 7 in a few positions of a circumference thereof. A disk rotor and a wheel of a disk brake device not shown are mountable in the other end of the shaft body 4 along one side of the flange 5 by bolts extending through the bolt holes 7.

Around the outer peripheral surface of the shaft body 4 is fitted the bearing 3, which has one inner ring 8 fitted around the outer peripheral surface of the shaft body, a single outer ring 9 having raceways arranged axially in two rows, a plurality of balls 10 arranged in two rows as rolling elements and two crown-shaped cages 11. The outer peripheral surface of the shaft body 4 constitutes the other inner ring of the bearing 3. On an outer peripheral surface of the outer ring 9 is provided a radially outward flange 12, through which the hub unit 1 is mounted non-rotatably to an axle not shown. The cylindrical portion 6 in the free end side of the shaft body 4 of the hub wheel 2 is bent and deformed radially outward, from a status of FIG. 1 to that of FIG. 2 to be caulked thereby, on the outer end face of the inner ring 8 of the bearing 3. Such caulking is done as shown in FIG. 3.

The hub unit 1 is placed non-movably on a base 13 using a fixing jig 14.

A caulking jig 15 is rolled in an arrow direction at a required rolling angle α in a state of being abutted to the inner peripheral surface of the cylindrical portion 6. Thus the cylindrical portion 6 is bent and deformed radially outward to be caulked on the outer end face of the inner ring 8 of the bearing 3 to constitute a caulked portion. Thereby, the bearing 3 is fitted to the hub wheel 2 so as not to come off, and the inner ring 8 of the bearing 3 is preloaded from the caulked portion.

With respect to the hub unit 1 having a structure described above, the inventors of the present invention carried out the following research on a cause of the crack generation in the inner peripheral surface of the cylindrical portion 6 which constitutes the caulked portion in order to lead the present invention to a completion.

The cylindrical portion 6 is formed by a turning work as a manner of a machine work using a turning tool, e.g. a cutting tool not shown. As shown in FIG. 4, when a surface layer 6a of an inner peripheral surface of a cylindrical portion 6 is overheated by the heat generated by a friction thereof with a turning tool in a turning work (a machine work heat), a texture thereof is degenerated into slightly stiffening or the like corresponding to a degree of the overheat. The degenerated layer 6a is referred to as a machine work degenerated layer for convenience of description.

According to an actual measurement, a depth of the machine work degenerated layer 6a from an uppermost surface thereof is approximately 3~5 μm. By using the turning tool, the machine work degenerated layer 6a is heated by the machine work heat and is subject to a compression and a strain in a turning work direction. Therefore, the stress remains in the machine work degenerated layer 6a of the cylindrical portion after a cool down. According to an actual measurement, the residual stress constitutes a circumferential compression stress or a strain stress according to a manner of the turning work.

Furthermore, on a surface of the machine work degenerated layer 6a, is formed a trace of a streaked machine work by the turning work. A figure of the streaked machine work trace constitutes streaks 6b circumferentially formed by the turning work on the surface layer of the inner peripheral surface of the cylindrical portion 6. The streaks 6b comprise uneven portions 6c in the axial direction and has an uneven pitch P corresponding to a manner of the turning work.

The machine work degenerated layer 6a is generated at a corresponding depth to abut a surface of the uneven portions 6c.

The uneven pitch P has a required pitch (an uneven pitch) P in the axial direction corresponding to a manner of the turning work such as a speed of maneuvering the turning tool in the axial direction and a rotational speed of the cylindrical portion 6 in the turning work.

According to an actual measurement, the residual stress within the machine work degenerated layer 6a corresponds or almost corresponds to the uneven pitch P and a surface roughness (Rz) thereof. Again, according to an actual measurement, as the manner of the turning work are miscellaneously varied, the crack generation ratio of the cracks which are generated on the surface of the machine work degenerated layer 6a changes depending on a degree of the residual stress left by the respective turning works.

FIG. 5 shows a result of actual measurements in various turning manners. In FIG. 5, a horizontal axis denotes the uneven pitch P (μm), while a vertical axis denotes a surface roughness (Rz) of a machine work degenerated layer 6a of an inner peripheral surface of a cylindrical portion 6.

A surface roughness in general corresponds to JIS (Japan Industrial Standard) B0601, which regulates a mean roughness in a central line (Ra), a maximum height (Rmax) and a ten-point mean roughness (Rz). In the present invention, the surface roughness of the machine work degenerated layer 6a is described in the ten-point mean roughness (Rz).

Regions S1 through S4 in FIG. 5 are hereby explained. The regions S1, S2, S3 and S4 are examples of region types with a crack generation ratio therein being respectively, zero, less than 0.5%, between 0.5% and less than 1.0%, and 1.0% or more. Whenever necessary, there may be more or less regions for classification.

FIG. 5 denotes the plural regions S1 through S4, which control the respective crack generation ratio set by a combination of the uneven portions 6c, which is a figure of the turning work trace by the turning work formed on the surface layer 6a of the inner peripheral surface of the cylindrical portion 6, and the surface roughness Rz of the surface layer 6a of the inner peripheral surface of the cylindrical portion 6.

The region S1 is constituted by a combination of the surface roughness Rz being 12.5 µm or less and the uneven pitch P being 150 µm or less, wherein the residual stress is zero or constitutes a compression stress. The crack generation ratio in the region S1 is zero. When the compression stress is a negative stress, a strain stress is, on the contrary, a positive stress, therefore the residual stress in the region S1 is zero or constitutes a negative stress.

The region S2 is constituted by a combination of the surface roughness Rz being 12.5 µm or less and the uneven pitch P being 150 –190 µm. The strength of the strain stress is 5 kgf/mm$^2$ or less. When the residual stress constitutes the strain stress, that is a positive stress, and the strength thereof is 5 kgf/mm$^2$ or less, the crack generation ratio in the region S2 is not zero, however does not exceed 0.5%.

The region S3 comprises a region S31 of the surface roughness Rz being 12.5–15 µm and the uneven pitch P being 190 µm or less and a region S32 of the surface roughness Rz being 15 µm or less and the uneven pitch P being 190–250 µm. The residual stress in the region S3 constitutes a positive stress, that is namely the strain stress. The strength of the strain stress is 5–10 kgf/mm$^2$. The crack generation ratio in the region S3 is 0.5% or more, which is larger than the same in the region S2, however remains less than 1.0%.

The region S4 is not comprised in the before-mentioned regions S1 through S3. The residual stress in the region S4 constitutes a positive stress, that is the strain stress, the strength of which is 10 kgf/mm$^2$ or more. The crack generation ratio in the region S4 is the largest in all the regions, marking 1.0% or more.

As described, when a user of the hub unit 1 demands a hub unit 1 of no crack generation, the region S1 is to be selected, in response to which, the residual stress is to be set to zero or to constitute the compression stress. In response to the setting, the cylindrical portion 6 is formed by the turning work.

When the hub unit 1 with less than 0.5% of the crack generation ratio is demanded, the region S2 is to be selected, in response to which, the residual stress is set to 5 kgf/mm$^2$ or less. In response to the setting, the cylindrical portion 6 is formed by the turning work.

When the hub unit 1 with less than 1.0% of the crack generation ratio is demanded, the region S3 is to be selected, in response to which, the residual stress is set to 10 kgf/mm$^2$ or less. In response to the setting, the cylindrical portion 6 is formed by the turning work.

It is known from the above result, when the cylindrical portion 6 is turned at a high turning speed, the residual stress becomes larger. In the case of the shaft body 4 having such cylindrical portion 6 therefore, the crack generation ratio in accordance with caulking with respect to the outer end face of the inner ring 8 becomes larger.

On the other hand, when the cylindrical portion 6 is turned at a low turning speed, the residual stress becomes smaller. In the case of the shaft body 4 having such cylindrical portion 6, therefore the crack generation ratio in accordance with caulking with respect to the outer end face of the inner ring 8 becomes smaller.

Moreover, when the cylindrical portion 6 is caulked, the residual stress, when constituting the compression stress, remains in the cylindrical portion 6. However, the residual stress, when constituting the strain stress, becomes nil due to the crack generation.

As described, according to the hub unit 1 in the embodiment of the present invention, when the residual stress in the cylindrical portion 6 is controlled to be set, the crack generation status can be detected in the manufacturing stage. Consequently, it becomes unnecessary to execute an inspection to check a total number of cracks after manufacturing, whereby the manufacturing efficiency of the hub unit 1 can be improved and the manufacturing cost can be reduced.

ANOTHER MODE FOR CARRYING OUT THE INVENTION

The present invention is not restricted to the hub unit 1 of the embodiment and can be uniformly applied to hub units shown in FIGS. 6 through 10. In all these figures, like components in FIG. 1 are indicated by the same numerals.

Figure 6:
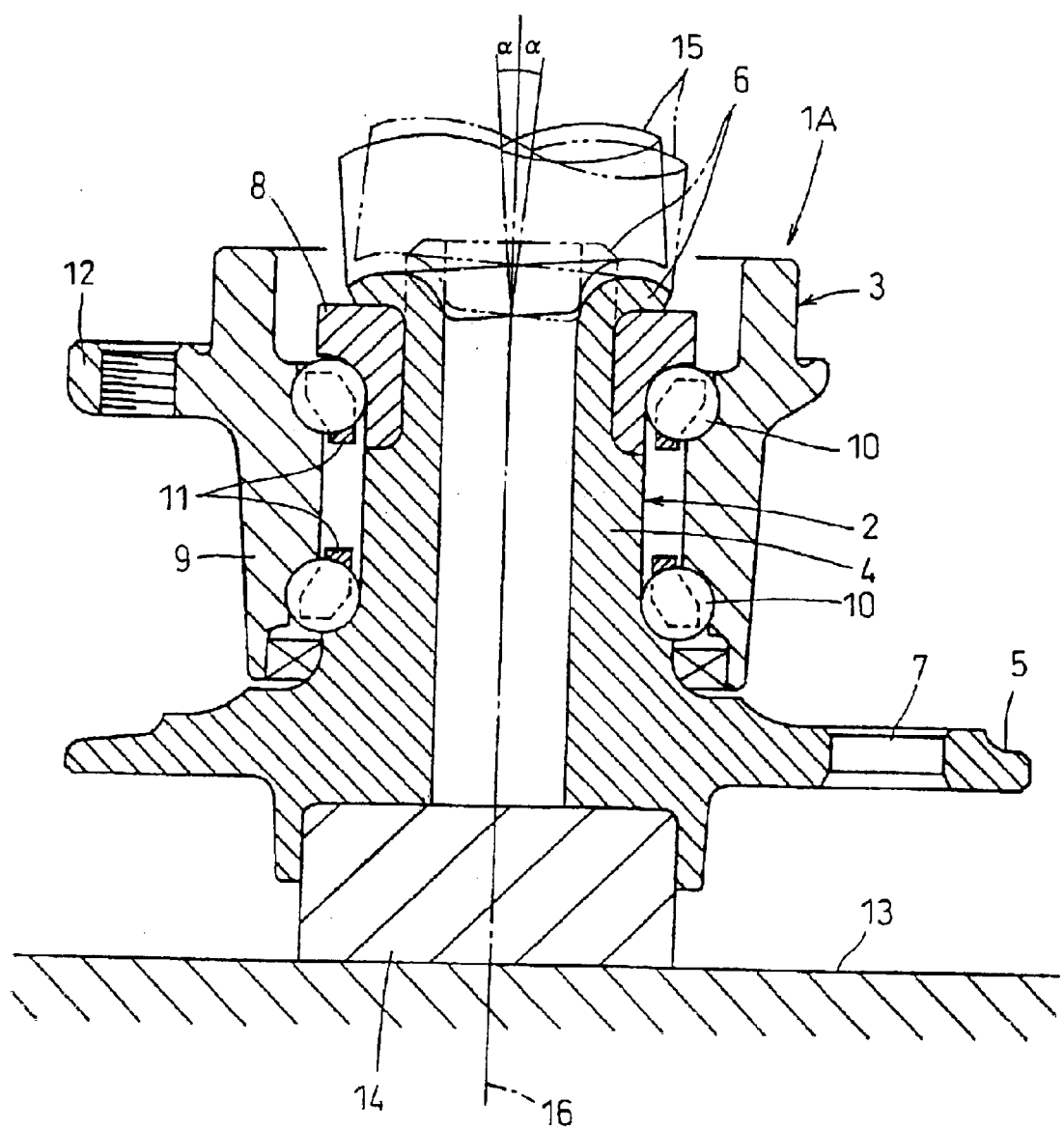
FIG. 6 is a longitudinal sectional view of a hub unit according to another mode for executing the present invention.

A hub unit 1A in FIG. 6 constitutes a driving wheel type having a hollow shaft body 4. The hub unit 1A, except a structure of the shaft body 4, has the same structure as the hub unit 1 in FIG. 1.

Figure 7:
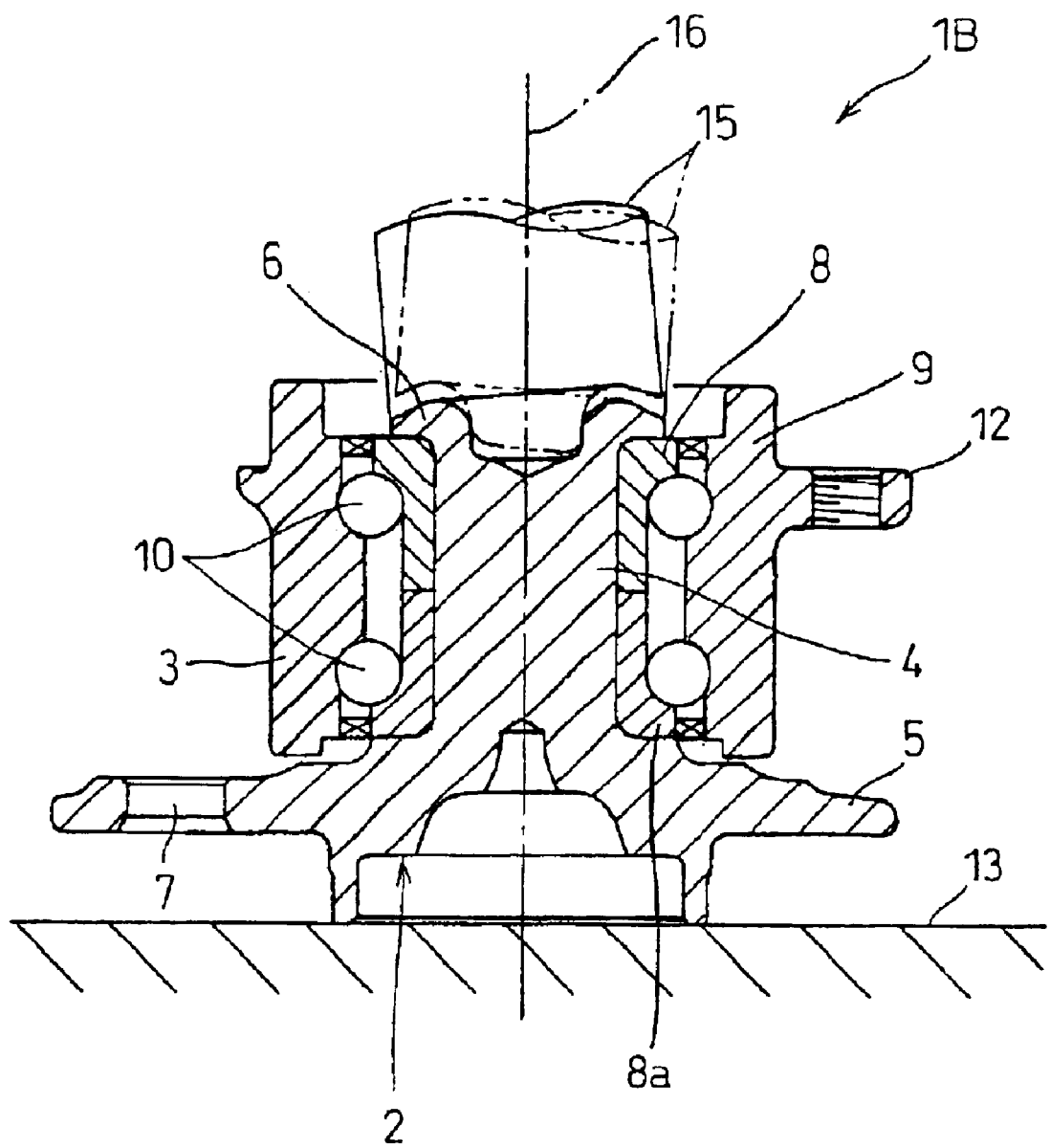
FIG. 7 is a longitudinal sectional view of a hub unit according to still another mode for executing the present invention.

A hub unit 1B in FIG. 7 constitutes a driven wheel type, wherein a bearing 3 equips two inner rings 8 and 8a located adjacent to each other in an axial direction. The hub unit 1B equips the inner ring 8a and, except the structure of a shaft body 4 corresponding thereto, has substantially the same structure as the hub unit 1 in FIG. 1.

A hub unit 1C in FIG. 8 constitutes a driving wheel type, wherein a bearing 3 is equipped with two inner rings 8 and 8a in a state of being located adjacent to each other in the axial direction. The hub unit 1C equips the inner ring 8a, and except the structure of a shaft body 4 corresponding thereto, has substantially the same structure as the hub unit 1 in FIG. 1.

Figure 9:
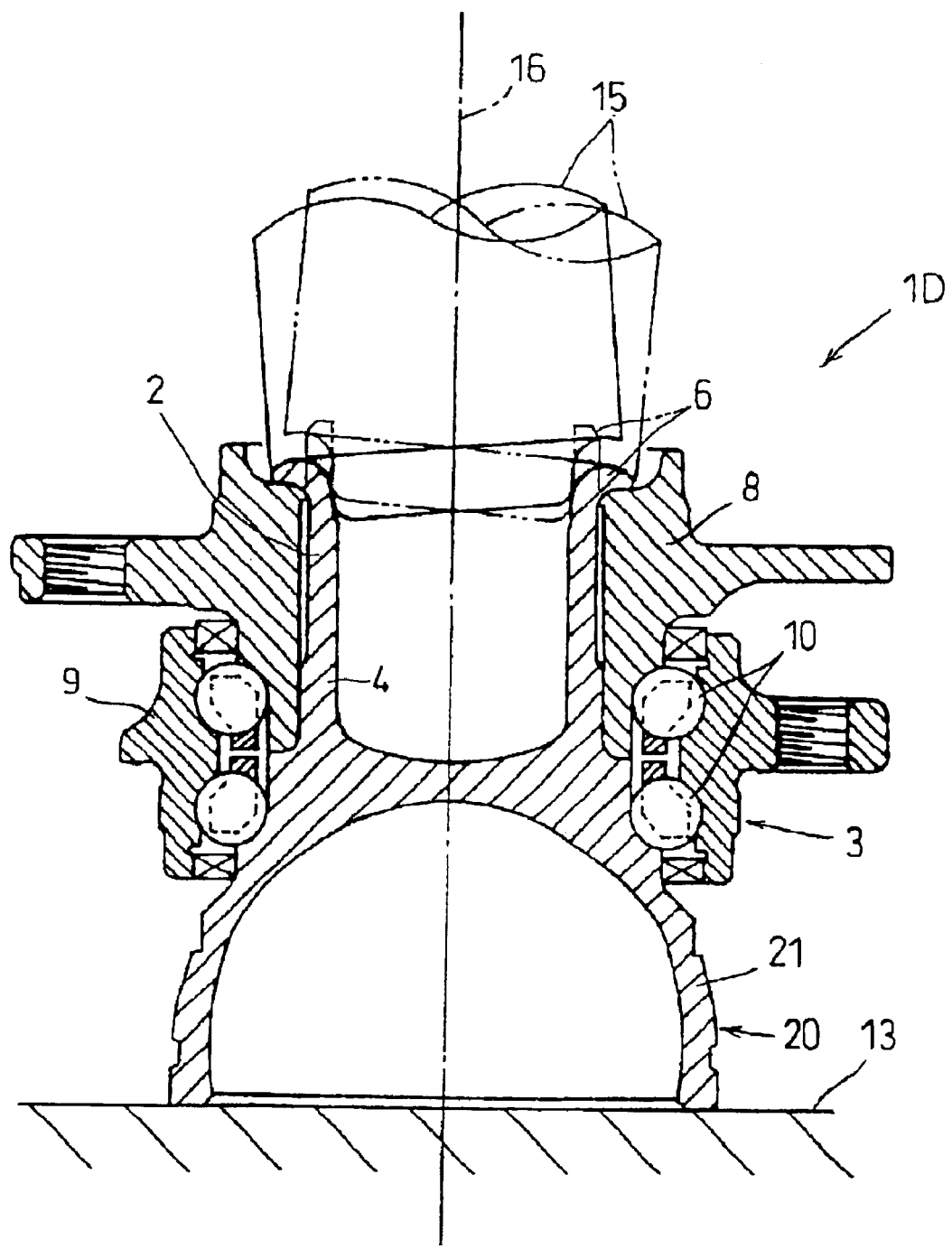
FIG. 9 is a longitudinal sectional view of a hub unit according to still another mode for executing the present invention.

A hub unit 1D in FIG. 9 constitutes a driving wheel type, wherein an outer ring 21 of a constant velocity joint 20 is integrally provided in a hollow shaft body 4.

Figure 10:
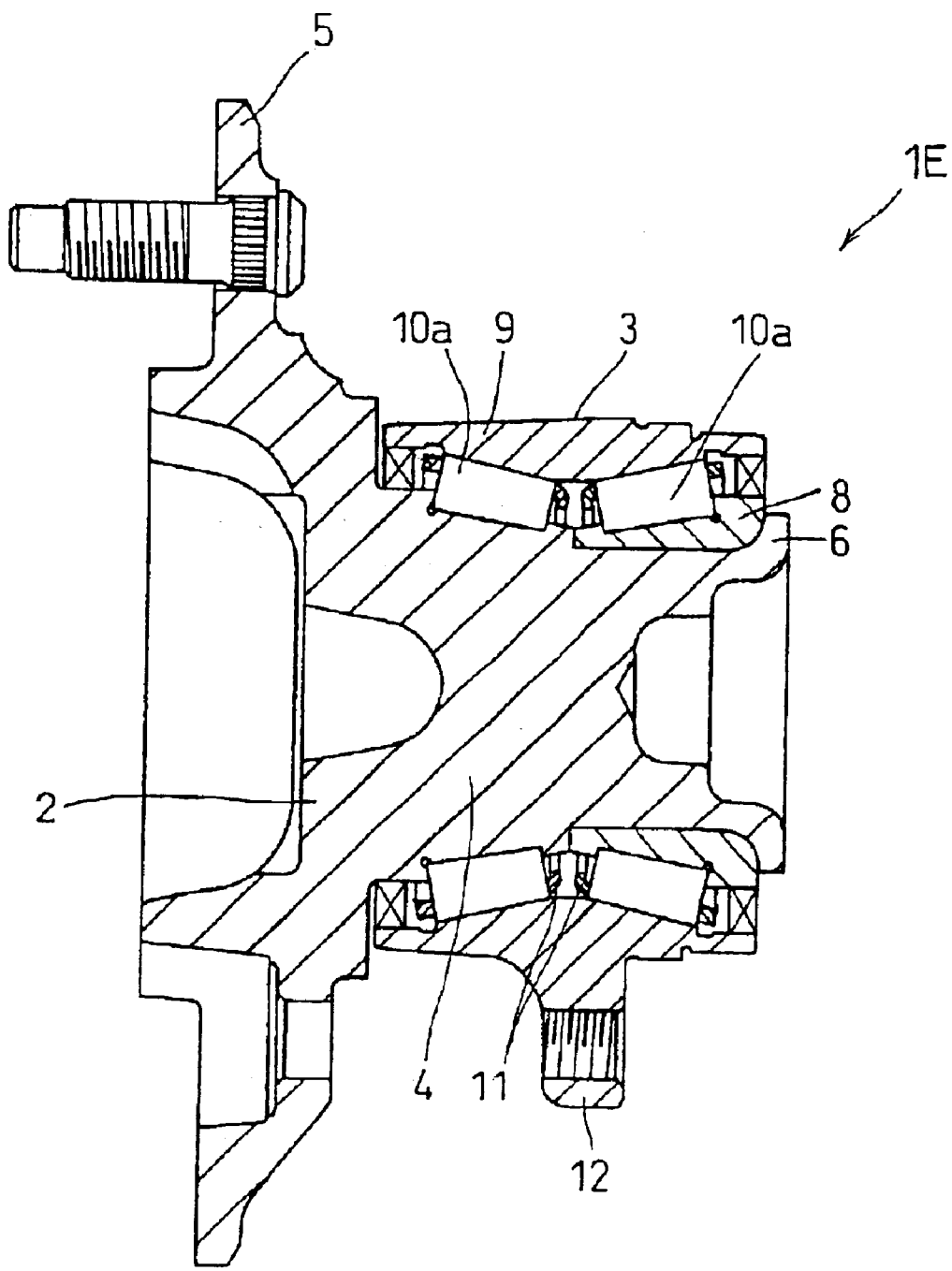
FIG. 10 is a longitudinal sectional view of a hub unit according to still another mode for executing the present invention.

A hub unit 1E in FIG. 10 constitutes a driven wheel type, wherein a bearing 3 constitutes a double row tapered roller bearing with vertex of contact angles outside of bearing. The bearing 3 comprises a single outer ring 9 having a double row rolling surface, a plurality of tapered rollers 10a arranged in the double row rolling surface and an inner ring 8 having a single rolling surface and fitted around an outer peripheral surface of a shaft body 4 of a hub wheel 2. In FIGS. 7 through 9, the hub unit is directly placed on a base 13, however is not restricted to the structure, and as shown in FIG. 6, can be placed on the base 13 by a fixing jig 14.

In addition, the hub unit in FIG. 10 may be comprised in a manner that the bearing 3 equips two inner rings located adjacent to each other in the axial direction, or may constitute a driven wheel type having a hollow shaft body, though not shown.

In the case of the hub units 1A–1E in FIGS. 6 through 10, the cylindrical portion 6 respectively provided in a free end side of the shaft body 4 is bent and deformed radially outward by a rolling caulking, as in the same manner as the hub unit 1 in the embodiment described earlier, to be caulked thereby on an outer end face of the inner ring 8 of the bearing 3.

The turning work forms an inner peripheral surface of the respective cylindrical portion 6, in which a residual stress left in a surface layer by the turning work is set in the same manner as in the embodiment described earlier.

Possibility of Industrial Application

The present invention can be applied to a vehicle-use hub unit wherein a disk rotor of a disk brake device and a wheel can be mounted and other bearing devices and a method of manufacturing the same.

What is claimed is:

1. A bearing device comprising:
    a shaft body having a caulking cylindrical portion formed by a machine work on a free end side thereof; and
    a rolling bearing fitted around an outer periphery of said shaft body, said rolling bearing having an inner ring;
    wherein said cylindrical portion is bent and deformed radially outward to be caulked on an outer end face of said inner ring of said rolling bearing; and
    a residual stress left in a surface layer of an inner peripheral surface of said cylindrical portion by said machine work is set to a value capable of restraining a crack generation ratio in said inner peripheral surface of said cylindrical portion to less than a predetermined rate.

2. A bearing device according to claim 1;
    wherein said cylindrical portion is bent and deformed radially outward by a rolling caulking.

3. A bearing device according to claim 1;
    wherein said residual stress is set to a value of not more than 5 kgf/mm$^2$.

4. A bearing device according to claim 1;
    wherein said residual stress is set to a value of not more than 10 kgf/mm$^2$.

5. A bearing device according to claim 1;
    wherein said cylindrical portion is formed by a turning work.

6. A bearing device according to claim 5;
    wherein said residual stress is set according to a figure of a turning work trace generated in said surface layer of said inner peripheral surface of said cylindrical portion by said turning work.

7. A bearing device according to claim 5;
    wherein said figure of said turning work trace constitutes circumferential streaks formed by a turning work in said surface layer of said inner peripheral surface of said cylindrical portion; and
    a pitch formed by axially uneven portions (an uneven pitch) formed by said streaks in said surface layer is set according to said residual stress.

8. A bearing device according to claim 7;
    wherein said residual stress is set based on a crack generation ratio set by a combination of said uneven pitch and a surface roughness of said surface layer.

9. A bearing device according to claim 8;
    wherein said combination is constituted by said surface roughness of not more than 12.5 $\mu$m and said uneven pitch of not more than 150 $\mu$m.

10. A bearing device according to claim 8;
    wherein said combination at least comprises a combination of said surface roughness of not more than 12.5 $\mu$m and said uneven pitch of not more than 150 $\mu$m and a combination of said surface roughness of not more than 12.5 $\mu$m and said uneven pitch of 150–190 $\mu$m, and one of which is selected.

11. A bearing device comprising:
    a shaft body having an axially cylindrical portion on a free end side thereof; and
    a rolling bearing fitted around an outer periphery of said shaft body;
    wherein said cylindrical portion is formed by a turning work and bent and deformed radially outward by a rolling caulking to be caulked thereby on an outer end face of an inner ring of said rolling bearing; and
    a residual stress left in a surface layer of said inner peripheral surface of said cylindrical portion by said turning work is set to a value capable of restraining a crack generation ratio in said inner peripheral surface to less than a predetermined rate.

12. A bearing device according to claim 11;
    wherein said residual stress is set based on a crack generation ratio set by a combination of a figure of said turning work trace formed in said surface layer of said inner peripheral surface of said cylindrical portion and said surface roughness of said surface layer.

13. A method of manufacturing a bearing device comprising:
    a shaft body having an axially cylindrical portion on a free end side thereof; and
    a rolling bearing fitted around an outer periphery of said shaft body;
    having a first step wherein said cylindrical portion, is formed by a machine work; and
    a second step wherein said cylindrical portion formed by said first step is bent and deformed radially outward to be caulked thereby on an outer end face of an inner ring of said rolling bearing;
    wherein said machine work is executed in a manner that said first step sets said residual stress left in said surface layer of said inner peripheral surface of said cylindrical portion to a value capable of restraining a crack generation ratio in said inner peripheral surface to less than a predetermined rate.

14. A method of manufacturing a bearing device according to claim 13;
    wherein said second step bends and deforms said cylindrical portion radially outward by a rolling caulking.

15. A method of manufacturing a bearing device according to claim 13;
    wherein said residual stress is set to a value of not more than 5 kgf/mm$^2$.

16. A method of manufacturing a bearing device according to claim 13;
    wherein said residual stress is set to a value of not more than 10 kgf/mm$^2$.

17. A method of manufacturing a bearing device according to claim 13;
    wherein said first step forms said cylindrical portion by a turning work.

18. A method of manufacturing a bearing device according to claim 14;
    wherein said residual stress is set corresponding to a figure of a turning work trace generated in said surface layer of said inner peripheral surface of said cylindrical portion by said turning work.

19. A method of manufacturing a bearing device according to claim 18;
    wherein a figure of said turning work trace constitutes circumferential streaks formed by a turning work in said surface layer of said inner peripheral surface of said cylindrical portion; and a pitch formed by axially uneven portions (an uneven pitch) formed by said streaks in said surface layer is set according to said residual stress.

20. A method of manufacturing a bearing device according to claim 14;

wherein said residual stress is set corresponding to a figure of a turning work trace formed by said turning work in said surface layer of said inner peripheral surface of said cylindrical portion and a surface roughness of said surface layer.

21. A method of manufacturing a bearing device according to claim 20;

wherein a figure of said turning work trace constitutes circumferential streaks formed by a turning work in said surface layer of said inner peripheral surface of said cylindrical portion;

said streaks comprise uneven portions in said surface layer along an axial direction.

22. A method of manufacturing a bearing device according to claim 17;

wherein said residual stress is set based on a crack generation ratio set by a combination of a figure of a turning work trace formed by said turning work in said surface layer of said inner peripheral surface of said cylindrical portion and a surface roughness of said surface layer.

23. A shaft body for a bearing device comprising:

a rolling bearing fitted around an outer periphery thereof; and a cylindrical portion which is bent and deformed radially outward in a free end side of a shaft body to be caulked thereby on an outer end face of an inner ring of said rolling bearing;

wherein said cylindrical portion is formed by a machine work, and a residual stress left by said machine work in a surface layer of an inner peripheral surface of said cylindrical portion is set to a value capable of restraining a crack generation ratio to less than a predetermined rate.

24. A shaft body for a bearing device according to claim 23;

wherein said cylindrical portion is bent and deformed radially outward by a rolling caulking.

25. A shaft body for a bearing device according to claim 23;

wherein said residual stress is set to a value of not more than 5 kgf/mm$^2$.

26. A shaft body for a bearing device according to claim 23;

wherein said residual stress is set to a value of not more than 10 kgf/mm$^2$.

27. A shaft body for a bearing device according to claim 23;

wherein said cylindrical portion is formed by a turning work.

28. A shaft body for a bearing device according to claim 27;

wherein said residual stress is set according to a figure of a turning work trace generated by said turning work in said surface layer of said inner peripheral surface of said cylindrical portion.

29. A shaft body for a bearing device according to claim 28;

wherein a figure of said turning work trace constitutes circumferential streaks formed by a turning work in said surface layer of said inner peripheral surface of said cylindrical portion; and a pitch formed by axially uneven portions (an uneven pitch) formed by said streaks in said surface layer is set according to said residual stress.

30. A shaft body for a bearing device according to claim 29;

wherein said residual stress is set based on a crack generation ratio set by a combination of said uneven pitch and a surface roughness of said surface layer.

31. A shaft body for a bearing device according to claim 30;

wherein said combination is constituted by said surface roughness of not more than 12.5 μm and said uneven pitch of 150 μm.

32. A shaft body for a bearing device according to claim 30;

wherein said combination comprises at least a combination constituted by said surface roughness of not more than 12.5 μm and said uneven pitch of not more than 150 μm and a combination constituted by said surface roughness of not more than 12.5 μm and said uneven pitch of 150–190 μm, and one of which is selected.

33. A method of manufacturing a shaft body for a bearing device comprising;

a rolling bearing fitted around an outer periphery; and a cylindrical portion, provided on a free end side of a shaft body, bent and deformed radially outward to be caulked thereby on an outer end face of an inner ring of said rolling bearing, wherein said cylindrical portion is formed by a machine work and a residual stress left by said machine work in a surface layer of an inner periphery thereof is set to a value capable of restraining a crack generation ratio in said inner peripheral surface to a value less than a predetermined rate.

34. A method of manufacturing a shaft body for a bearing device according to claim 33;

wherein said cylindrical portion is bent and deformed radially outward by a rolling caulking.

35. A method of manufacturing a shaft body for a bearing device according to claim 33 wherein said residual stress is set to a value of not more than 5 kgf/mm$^2$.

36. A method of manufacturing a shaft body for a bearing device according to claim 33;

wherein said residual stress is set to a value of not more than 10 kgf/mm$^2$.

37. A method of manufacturing a shaft body for a bearing device according to claim 33;

wherein said cylindrical portion is formed by a turning work.

38. A method of manufacturing a shaft body for a bearing device according to claim 37;

wherein said residual stress is set according to a figure of a turning work trace generated by said turning work in said surface layer of said inner peripheral surface of said cylindrical portion.

39. A method of manufacturing a shaft body for a bearing device according to claim 38;

wherein said figure of said turning work constitutes circumferential streaks formed by a turning work in said surface layer of said inner peripheral surface of said cylindrical portion, and a pitch formed by axially uneven portions formed by said streaks in said surface layer is set according to said residual stress.

40. A method of manufacturing a shaft body for a bearing device according to claim 39;

wherein said residual stress is set based on a crack generation ratio set by a combination of said uneven pitch and a surface roughness of said surface layer.

41. A method of manufacturing a shaft body for a bearing device according to claim 40 wherein said combination is set to said surface roughness of not more than 12.5 $\mu$m and said uneven pitch of not more than 150 $\mu$m.

42. A method of manufacturing a shaft body for a bearing device according to claim 40;

wherein said combination at least comprises a combination constituted by said surface roughness of not more than 12.5 $\mu$m and said uneven pitch of not more than 150 $\mu$m and a combination constituted by said surface roughness of not more than 12.5 $\mu$m and said uneven pitch of 150–190 $\mu$m, and one of which is selected.

* * * * *